Patented Mar. 11, 1924.

1,486,353

UNITED STATES PATENT OFFICE.

GEORGE J. MESS AND GORDON B. MESS, OF INDIANAPOLIS, INDIANA.

PROCESS OF DYEING CLOTH WITH FAST COLORS.

No Drawing.   Application filed July 22, 1922.   Serial No. 576,810.

*To all whom it may concern:*

Be it known that we, GEORGE J. MESS and GORDON B. MESS, citizens of the United States, and residents of Indianapolis, county of Marion, and State of Indiana, have invented a certain new and useful Process of Dyeing Cloth with Fast Colors; and we do hereby declare that the following is a full, clear, and exact description thereof.

This invention relates to a new process for dyeing cotton, linen or silk cloth, either by spraying or printing the same, so as to fix the dye or coloring matter permanently in the cloth, thus imparting to the cloth fast colors which will not wash out or fade, and particularly to the caustic soda method for dyeing cotton and linen cloth.

The novel features of the process include first the proper preliminary preparation of the coloring material to be sprayed or printed on the cloth, and second, a novel manner of treating the cloth after the colors have been applied, whereby they are made fast and permanent.

This application relates also in particular to the use of said broad invention in the caustic soda method. The second part of said broad invention can also be used in the steaming method, but that method is reserved for another application for a patent, since it differs in the process of preparing the colors.

In the caustic soda method for coloring cotton and linen cloth the class of color to be used preferably in the spraying method for making fast colors are indanthrene, algol, cuba, ciba, cibanone, hydrone, helindone and indigo. It is preferable to use vat colors from 10% to 40% paste. The invention, however, is not limited to the above colors and these colors can be German, Swiss or American, although heretofore the German dyes worked best.

In order that these colors may be successfully applied in the printing process, it is essential that they be reduced and dissolved in a printing paste and then be reconverted by oxidation to their original insoluble form upon the fibre.

To prepare the color, gum tragacanth is used. This thickening is to act as a vehicle for carrying the color to the cloth and also to prevent its spreading by capillary attraction beyond the limits of its allotted space in the design. The gum tragacanth should be soaked for 24 to 30 hours and boiled until it is clear and a fluid-like syrup and then strained through a closely woven cloth to remove foreign matter.

Then two gum solutions are made which may be termed the "A" solution and the "B" solution. In making the A solution 60 grains of gum tragacanth are added to 940 grains of cold water and allowed to soak as stated and then boiled until it becomes quite smooth and afterwards allowed to cool.

In making the B gum solution take 350 grains of British gum (dextrine) and add it to 650 grains of cold water. The water used should be preferably distilled water.

Add 300 grains of the A gum solution to 345 grains of the B gum solution and to that add the color, say, 150 grains of color indanthrene blue in paste. Stir the combined mixture well until thoroughly mixed so as to keep the coloring matter from curdling. Thereafter add 90 grains of ferrous sulphate of iron, in powder form, 15 grains of stannous chloride or tin crystals and 100 grains of tartaric acid.

After thoroughly stirring all the chemicals with the color, the resulting solution is ready to be sprayed upon cotton or linen cloth through stencils. In preparing the combination of gum with other colors besides indanthrene blue, the following may be used. For the red color one can use algol red paste; for yellow, cibanone yellow; for orange, algol red paste and cibanone yellow paste; for violet, algol red paste and indanthrene blue paste; for grey, algol red paste, indanthrene blue paste and cibanone yellow paste; for brown, algol red paste, cibanone yellow paste and indanthrene blue paste; and for black, 100 grains of indanthrene blue paste, 35 grains of algol red paste and 15 grains of cibanone yellow paste.

In making up all of these color compounds with the proportions above specified, substantially 95 grains of distilled water are used.

Different shades can be obtained by adding different colors together. For the production of different shades of colors in spray printing paste, the proportions of the ingredients are substantially as follows:

|  | Dark. | Medium. | Light. |  | Pale. |
|---|---|---|---|---|---|
|  | Grains. | Grains. | Grains. | Grains. Grains. | Grains. |
| Coloring matter | 200 | 150 | 100 | 75   50 | 25 |
| Thickening as of (A) and (B) | 560 | 645 | 730 | 797½   865 | 915 |
| Ferrous sulphate | 120 | 90 | 60 | 45   30 | 30 |
| Stannous chloride | 20 | 15 | 10 | 7½   5 | 5 |
| Tartaric acid | 100 | 100 | 100 | 75   50 | 25 |
|  | 1000 | 1000 | 1000 | 1000  1000 | 1000 |

This invention is not limited to the use of gum tragacanth, as gum arabic will do by itself instead of other gums, although the former is preferable. Also zinc chloride may be used instead of stannous chloride, but the latter is preferable. The addition of tartaric acid is not absolutely necessary, but by it the paste is rendered more stable and the iron is more easily removed on acidifying and also the colors come out somewhat clearer and purer.

After the color compound has been made as above explained, it is sprayed on the cloth through stencils, or printed thereon when made heavier into a paste.

The third step in the process is to pass the cloth with the colors in it through certain solutions to make the colors fast. In these baths great care is necessary to have the chemicals at the proper temperature and of the proper density and to leave the cloth in the chemical baths for the proper time so as to fix or set the coloring matter. In the first place the cloth is passed through a solution of caustic soda heated preferably to 170 degrees Fahrenheit. The caustic soda should have a density of 20 Baumé (German scale) and the cloth should be left in the bath for from 30 to 35 seconds.

Then take the cloth out of the hot caustic soda and allow it to remain in the air about five seconds, after which it is submerged in a bath of cold caustic soda of 20 Baumé for about 15 to 20 seconds.

Then the cloth is removed from the cold caustic soda bath and washed in cold running water until all of the chemicals are removed. This washing should be done preferably in two separate and successive tanks and then the cloth should be placed in a bath of cold water containing sulphuric acid. Just enough acid is required to cause the solution to taste sour or acid. The cloth is left therein until the chemicals are all removed, after which the cloth is wrung out by a wringer. After the cloth is soaked in sulphuric acid bath, it should be washed and boiled in a soap solution. This helps to fix and make colors brighter.

The cloth on leaving the warm caustic soda should not be squeezed out, as there is danger thereby of the color marking off. For this reason the cloth is given a short passage through the air in order to cool it down after the warm bath.

After the cloth is passed through the cold caustic soda bath, it may be squeezed between rollers without danger. In passing the cloth through the cold running water the preferable method is to spray the same by a spraying apparatus. The cloth should not be allowed to remain in the air with the caustic soda solution on it very long because it will cause the cloth or color to lose shade and depth, and beauty of color. In the case of all but slightest colors, it is preferable to allow the cloth to lie in the sulphuric acid for some time before the cloth is boiled in the soda solution. The idea is to remove all traces of iron which, if allowed to remain, will oxidize to yellow ferric oxide and thus dull the colors.

To prevent colors from running in first hot caustic bath and to prevent the white cloth from being discolored which is liable to occur, if a number of printed pieces are passed continuously through the same caustic bath, add the following: 1 to 10 gallons manganese paste (according to the heaviness of the pattern) to 100 gallons of caustic soda liquor. This effects a precipitation of the excess of dyestuff or prevents the formation of a vat in the caustic bath itself.

A manganese paste for this purpose is prepared as follows: 7½ pounds manganese chloride are dissolved in 1¾ gallons cold water to which is then added ¼ gallon caustic soda, 53 degrees Twaddell, and ½ gallon bleaching powder solution, 12 degrees Twaddell. The manganese is thereby precipitated and the paste obtained contains about 15 per cent manganese.

The invention claimed is:

1. The process of dyeing cloth with fast colors including applying the colors to the cloth, passing the cloth with the colors in it through a heated solution of caustic soda, afterwards submerging the cloth in cold caustic soda, then washing the cloth in cold running water, and finally subjecting the cloth to a bath of cold water containing sulphuric acid.

2. The process of dyeing cloth with fast colors including applying the colors to the cloth, passing the cloth through a solution of caustic soda heated substantially to 170 degrees Fahrenheit and of a density of substantially 20 Baumé, afterwards submerging the cloth in cold caustic soda of a density of about 20 Baumé, then washing the cloth in cold running water, afterwards subjecting it to a bath of cold water containing enough sulphuric acid to give the solution an acid taste, and finally wringing out the cloth.

3. The process of dyeing cloth with fast colors including applying the colors to the cloth, passing the cloth through a solution of caustic soda heated to substantially 170 degrees Fahrenheit for about one-half of a minute, then leaving the cloth in the air for a few seconds, afterwards submerging the cloth in a bath of cold caustic soda for about one-third of a minute, then washing the cloth in cold running water, afterwards subjecting it to a bath of cold water containing sulphuric acid, boiling same in a soap bath, and finally wringing out the cloth.

4. The process of dyeing cloth with fast colors including applying the colors to the cloth, passing the cloth through a solution of caustic soda having a density of about 20 Baumé and heated to substantially about 170 degrees Fahrenheit and leaving the cloth in said bath about one-half of a minute, then leaving the cloth in the air about five seconds, submerging the cloth in a bath of cold caustic soda having a density of about 20 Baumé for about one-third of a minute, washing the cloth in two successive tanks of cold running water, subjecting the cloth to a bath of cold water containing sulphuric acid, boiling same in a soap bath, and finally wringing out the cloth.

5. The process of dyeing cloth with fast colors including the preparation of coloring material by forming a solution of gum tragacanth and another solution of dextrine and stirring with said two solutions the desired color in paste, ferrous sulphate in powder form, and stannous chloride, applying the colors to the cloth, passing the cloth with the colors in it through a heated solution of caustic soda, afterwards submerging the cloth in cold caustic soda, then washing the cloth in cold running water, and finally subjecting the cloth to a bath of cold water containing sulphuric acid.

6. The process of dyeing cloth with fast colors including the preparation of coloring material by forming a solution of gum tragacanth and cold water substantially in the proportion of 60 grains of the former and 940 grains of the latter and boiling the same until it becomes smooth and then cooling the same, forming another gum solution of dextrine and cold water in the proportion of about 35 grains of the former and 65 grains of the latter, combining said two gum solutions in the proportion of about 300 grains of the first solution to about 345 grains of the second solution, and stirring in with said gum solutions coloring matter, ferrous sulphate and stannous chloride in proportions to give the desired color and shade, applying the colors to the cloth, passing the cloth with the colors in it through a heated solution of caustic soda, afterwards submerging the cloth in cold caustic soda, then washing the cloth in cold running water, subjecting the cloth to a bath of cold water containing sulphuric acid, and finally boiling the same in a soap bath.

7. The process of dyeing cloth with fast colors including the preparation of coloring material by forming a solution of gum tragacanth and another solution of dextrine and stirring with said two solutions the desired color in paste, ferrous sulphate in powder form, stannous chloride and tartaric acid, applying the colors to the cloth, passing the cloth with the colors in it through a heated solution of caustic soda, then washing the cloth in cold running water, finally subjecting the cloth to a bath of cold water containing sulphuric acid, and boiling the same in a soap bath.

8. The process of dyeing cloth with fast colors including the preparation of coloring material by forming a solution of a thickening gum and mixing therewith the desired color in paste, ferrous sulphate and stannous chloride, then spraying or printing the colors on the cloth, passing the cloth with the colors in it through a hot solution of caustic soda, submerging it in cold caustic soda solution, then washing it in cold running water, and finally subjecting it to a bath of cold water containing sulphuric acid.

In witness whereof, we have hereunto affixed our signatures.

GEORGE J. MESS.
GORDON B. MESS.